March 30, 1954   H. A. KIBITZ, JR., ET AL   2,673,673
MACHINE FOR FILLING MATTRESS CASINGS AND THE LIKE
Filed April 1, 1948   8 Sheets-Sheet 1
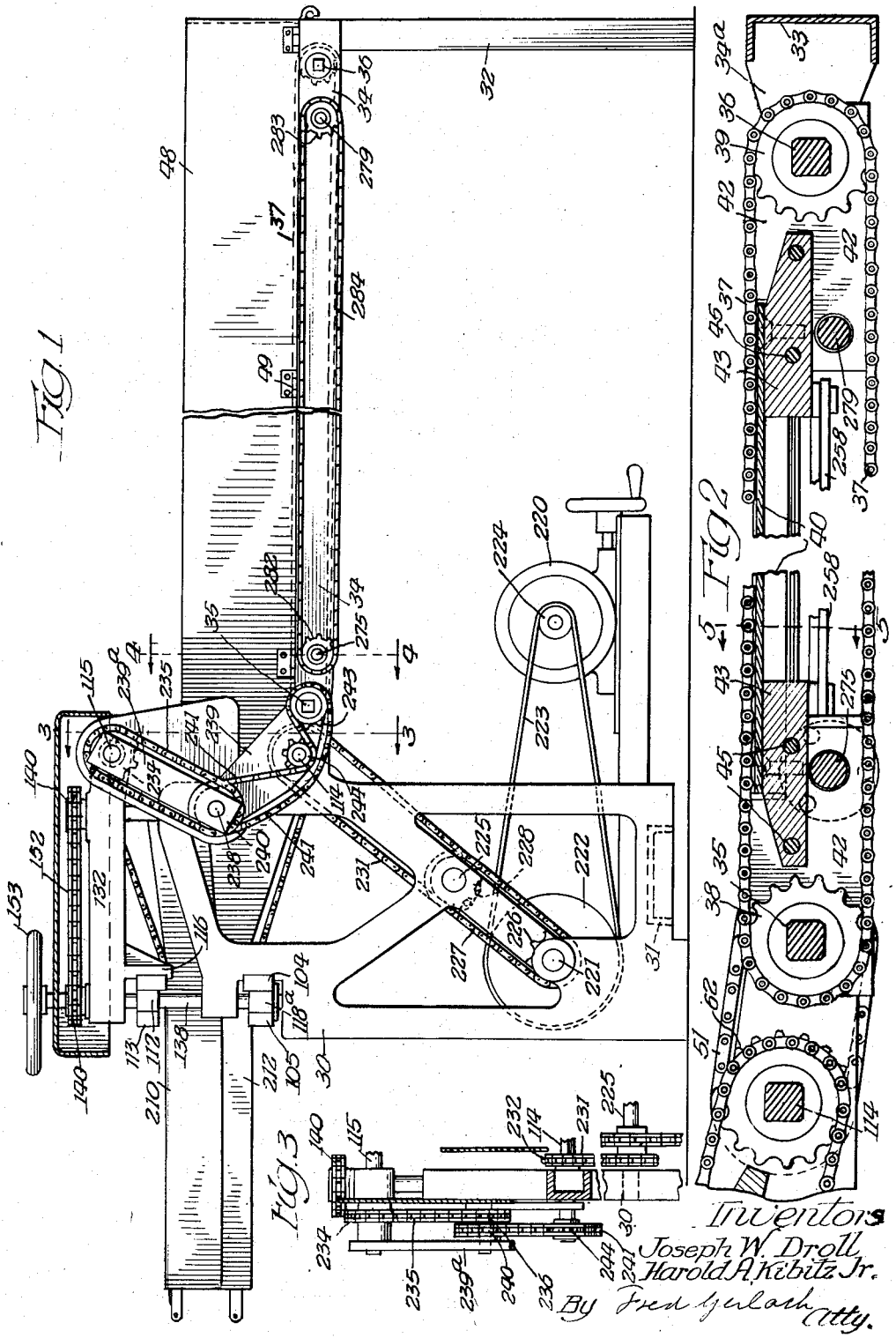
Inventors
Joseph W. Droll
Harold A. Kibitz Jr.
By Fred Gerlach Atty.

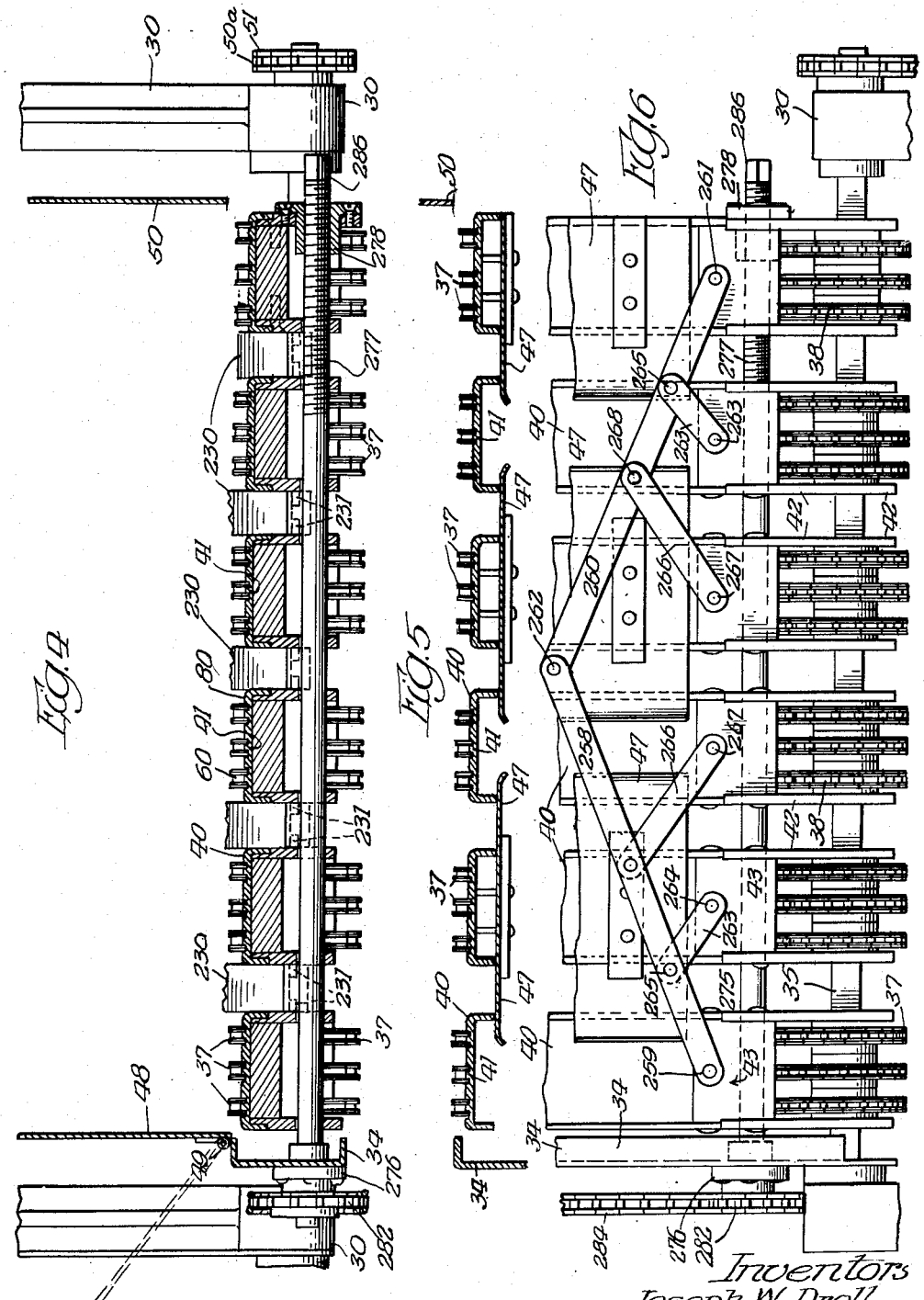

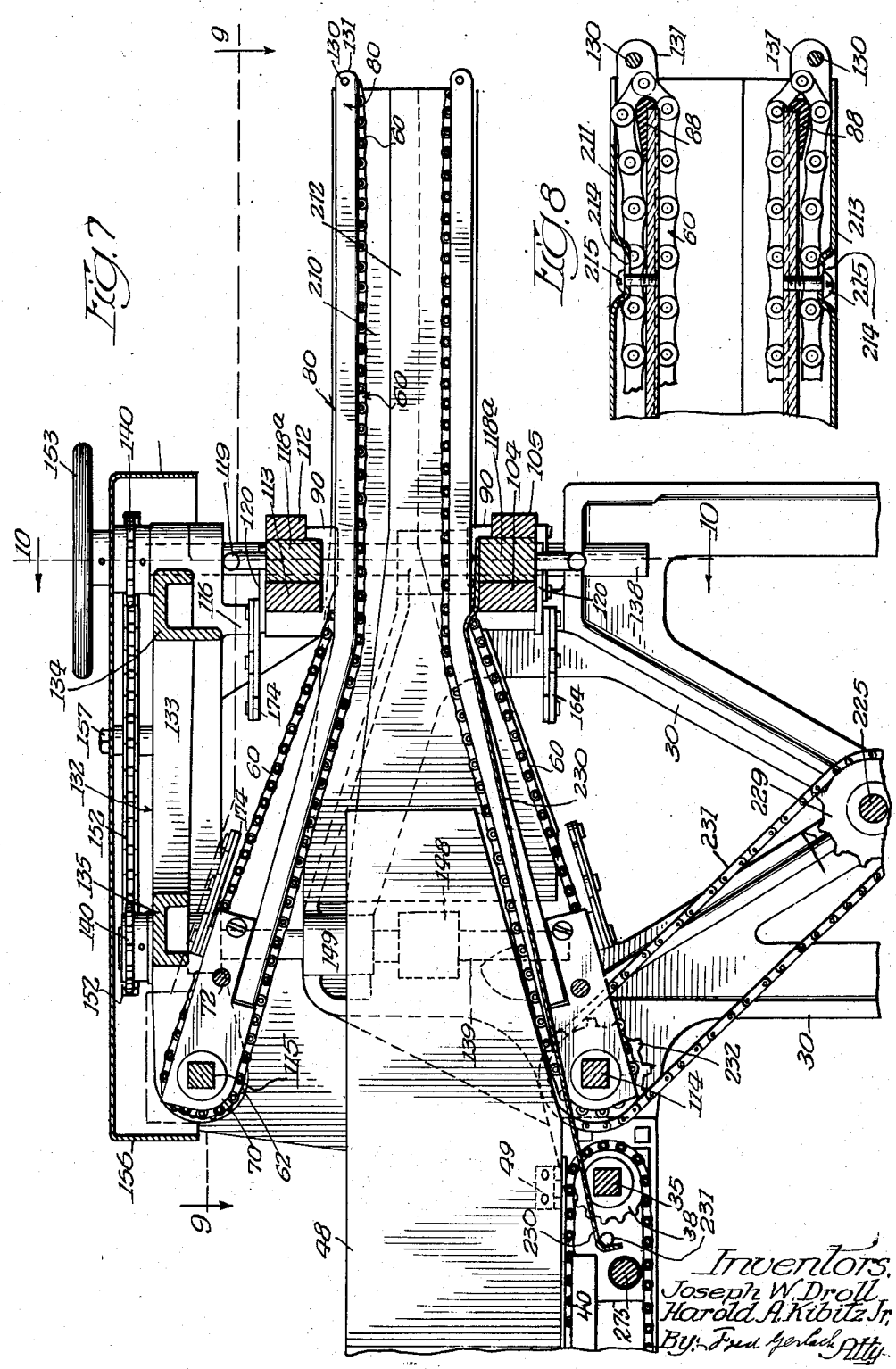

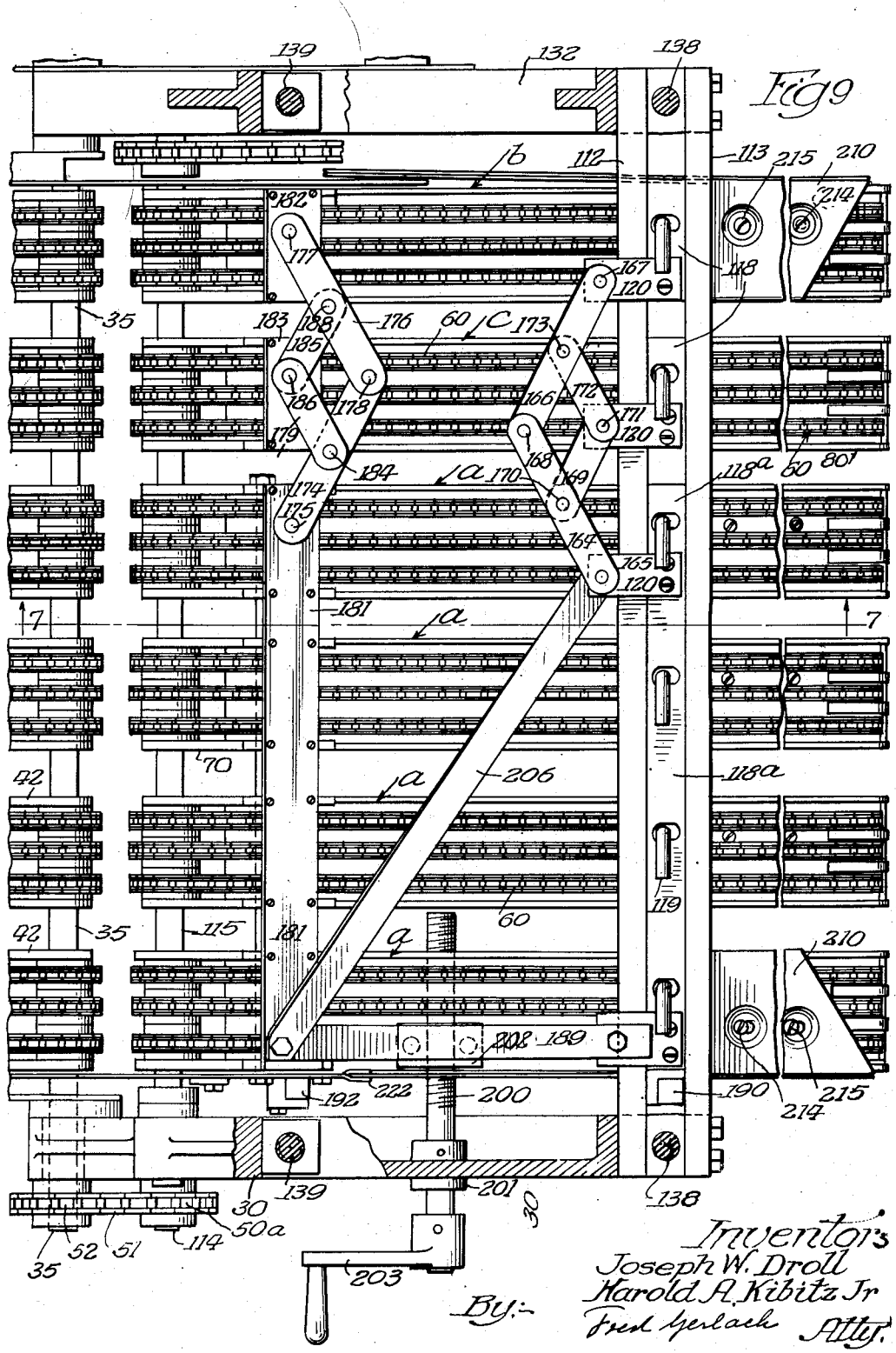

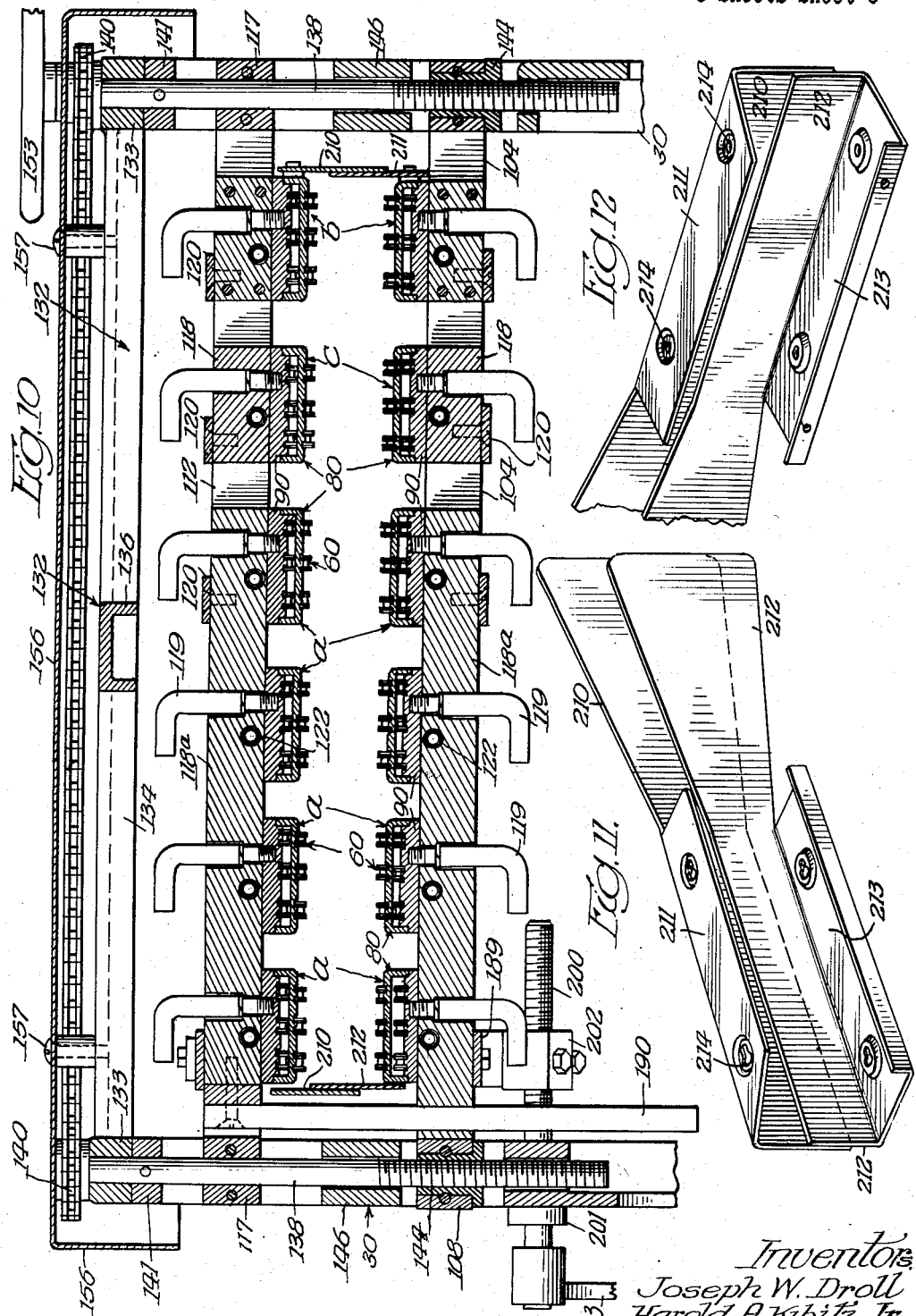

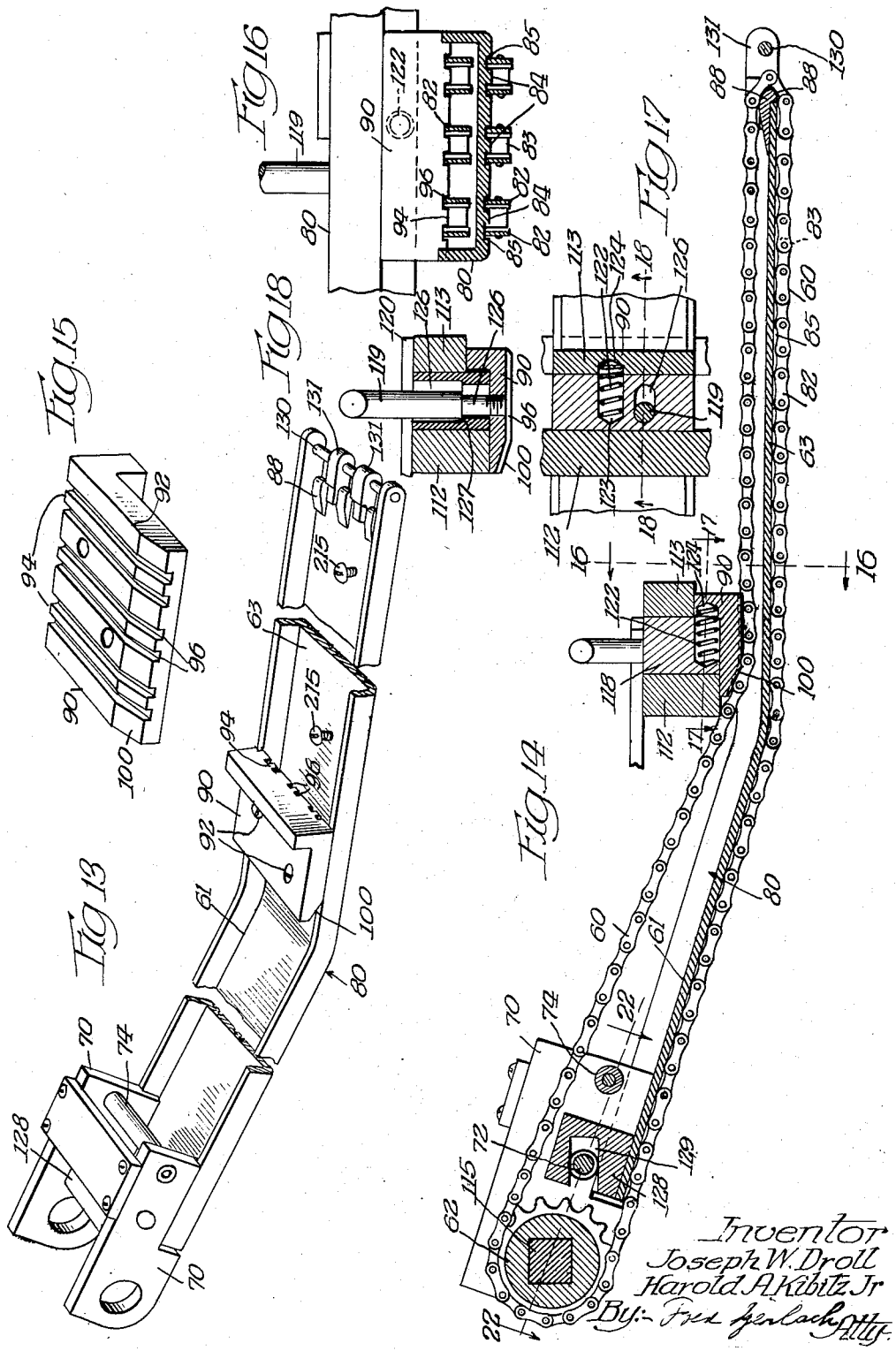

March 30, 1954 H. A. KIBITZ, JR., ET AL 2,673,673
MACHINE FOR FILLING MATTRESS CASINGS AND THE LIKE
Filed April 1, 1948 8 Sheets-Sheet 7
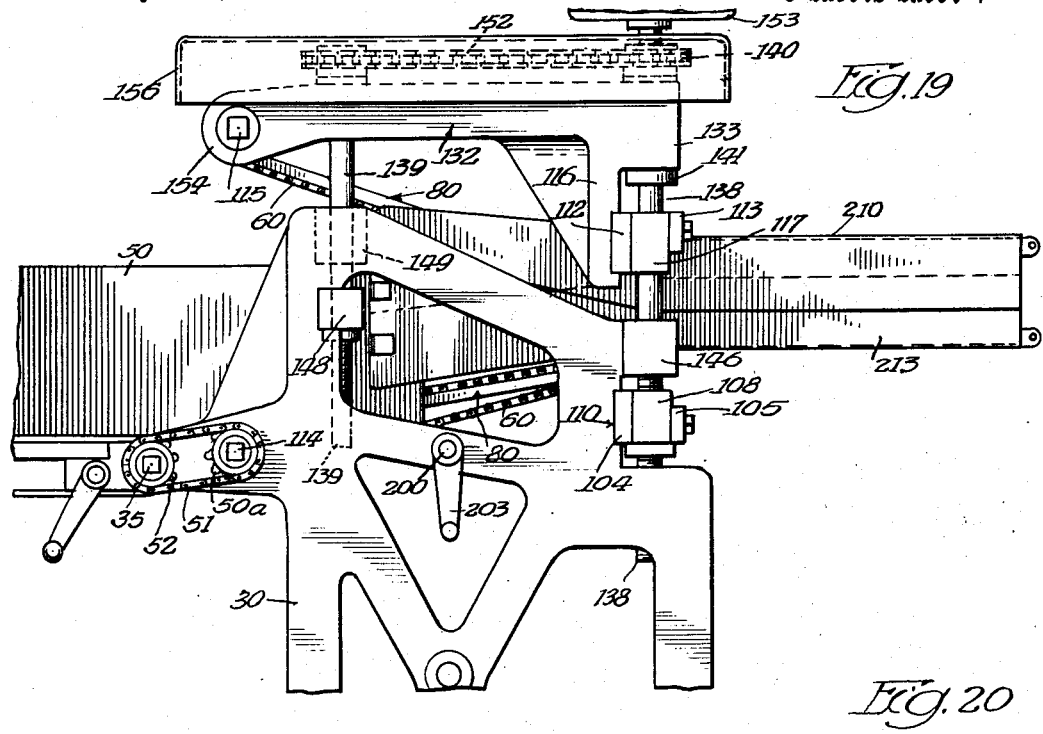
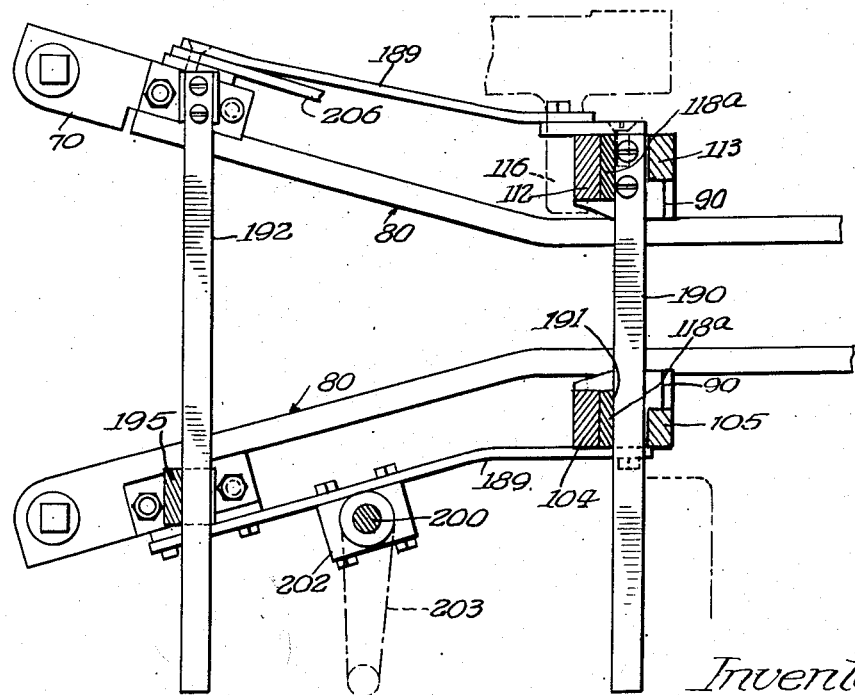
Inventors
Joseph W. Droll
Harold A. Kibitz Jr.
By Fred Gerlach Atty.

March 30, 1954   H. A. KIBITZ, JR., ET AL   2,673,673
MACHINE FOR FILLING MATTRESS CASINGS AND THE LIKE
Filed April 1, 1948                              8 Sheets-Sheet 8
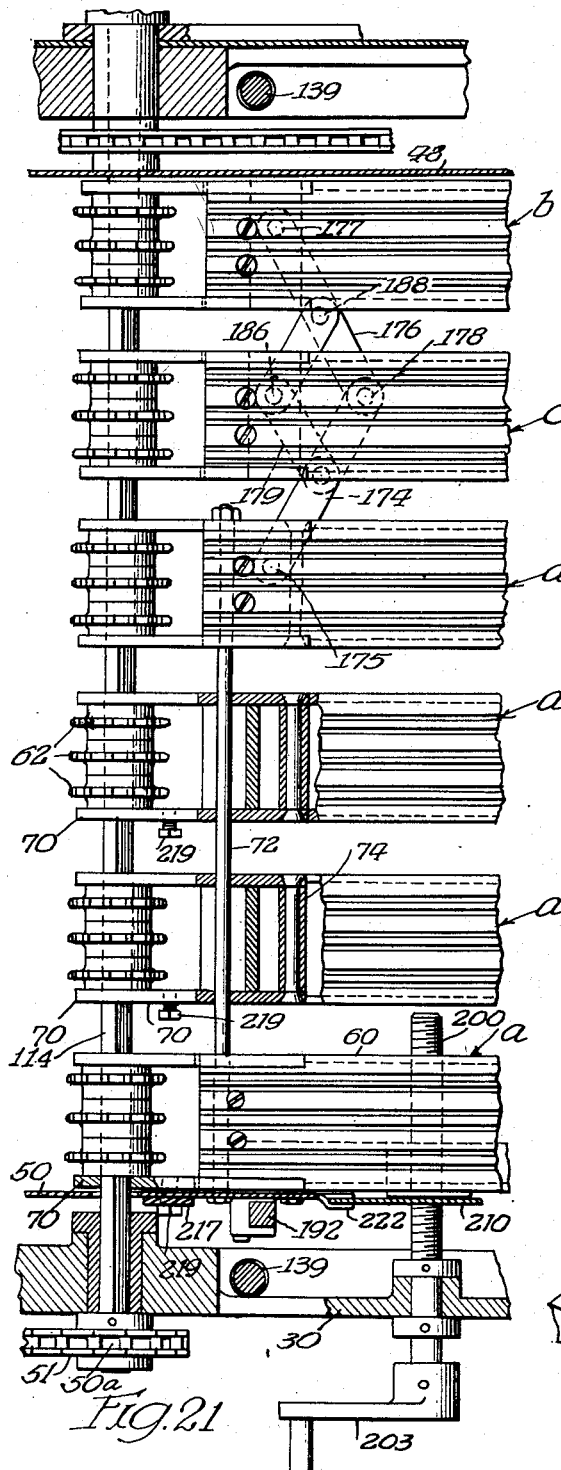
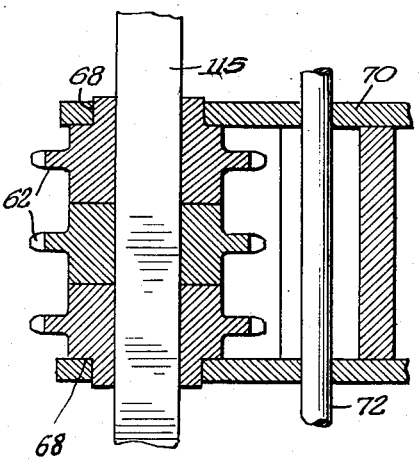
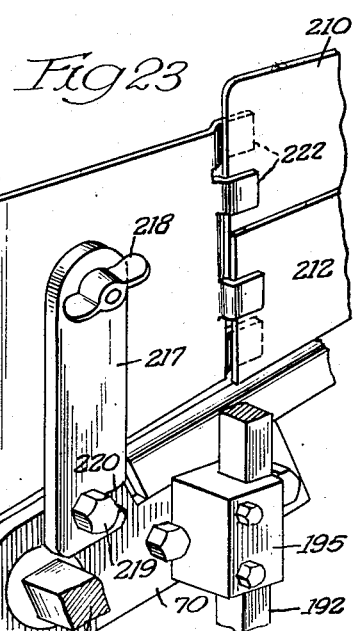

Patented Mar. 30, 1954

2,673,673

UNITED STATES PATENT OFFICE 2,673,673

MACHINE FOR FILLING MATTRESS CASINGS AND THE LIKE

Harold A. Kibitz, Jr., Chicago, and Joseph W. Droll, Wilmette, Ill., assignors, by mesne assignments, to United Mattress Machinery Company, Quincy, Mass., a corporation of Maine Application April 1, 1948, Serial No. 18,418

24 Claims. (Cl. 226—45)

1

The invention relates to machines for filling mattresses or cushions.

The several objects of the invention are to provide a machine with separate conveyor units, each of which includes a group of parallel chains and a guide bar with individual tracks thereon for chains of the group; units for compressing the filling-material and conveying it through a spout into the casings, which include conveyor chains extending continuously through the compressing and spout-forming portions of the units; improved means for varying the spacing of the units for filling casings of different widths; improved means for adjusting the vertical spacing of upper and lower units for mattresses or cushions of different thicknesses; improved devices for keeping the endless conveyor chains taut; improved devices for confining the filling-material to different members of the units for filling casings of different widths; improved means for stripping the filling-material from the conveyor chains at their discharge ends; and other objects which will appear from the detail description.

The invention consists in the several novel features hereinafter set forth and more particularly defined at the conclusion hereof.

In the drawings:

Fig. 1 is a side elevation of a machine embodying the invention, the cover for the compressor section being shown in section;

Fig. 2 is a longitudinal section of one of the conveyor units of the delivery section for the filling-material, the control portion of the unit being broken away;

Fig. 3 is a transverse section taken on the line 3—3 of Fig. 1;

Fig. 4 is a section taken on line 4—4 of Fig. 1;

Fig. 5 is a transverse section taken on line 5—5 of Fig. 2;

Fig. 6 is an inverted plan view illustrating one of the linkages between the units of the delivery sections;

Fig. 7 is a vertical longitudinal section taken on line 7—7 of Fig. 9;

Fig. 8 is a detail section illustrating one of the devices at the discharge end of the spout for stripping the material from the conveyor chains;

Fig. 9 is a section taken on line 9—9 of Fig. 7;

Fig. 10 is a transverse section taken on line 10—10 of Fig. 7;

Fig. 11 is a perspective of the sectional detachable fixed side-closure for the compressor and spout sections;

Fig. 12 is a perspective of a portion of the sectional fixed side-closure for the compressor and spout sections;

2

Fig. 13 is a perspective of one of the guide bars of one of the upper compressor and spout units and parts mounted thereon;

Fig. 14 is a central longitudinal section of one of the upper compressor and spout units;

Fig. 15 is a perspective of one of the guide-shoes fixed to one of the guide bars of a compressor and spout unit;

Fig. 16 is a section taken on line 16—16 of Fig. 14;

Fig. 17 is a section taken on line 17—17 of Fig. 14;

Fig. 18 is a section taken on line 18—18 of Fig. 17;

Fig. 19 is a side elevation of the front portion of the machine;

Fig. 20 is a section illustrating the upper and lower compressor and spout units and the devices for connecting them for conjoint transverse adjustment of the upper and lower units;

Fig. 21 is a plan, parts being shown in section, of the inner end portions of the lower units of the compressor section;

Fig. 22 is a section taken on line 22—22 of Fig. 14; and

Fig. 23 is a perspective illustrating the connection between the side closures for the compressor units and one side of the delivery section.

The invention is exemplified in a machine for filling mattresses or cushions, which comprises generally a delivery or feed section for the loose filling-material, a convergent conveyor section for compressing the filling-material, and a spout section or extension which delivers the compressed material from the compressor section into the mattress casing or cushion cover.

The supporting structure of the machine comprises: a pair of side frames 30 which are rigidly connected by a cross-beam 31 and are disposed at the sides of the compressor and spout sections; a side-beam 34 having its front end fixedly secured to one of the side frames 30; and a pair of legs 32 which are rigidly cross-connected by a channel beam 33.

The delivery section comprises a series of conveyor units which are supported on a transverse drive shaft 35 which is journalled in side frames 30, and on an idler shaft 36 which is supported in a journal on the side-beam 34 and a journal on bracket 34a, which is fixed to cross-beam 33 and one of the legs 32.

Each conveyor unit of the delivery section comprises: a channeled guide-bar 40, a pair of end-members 42 at each end of the bar, a connecting block 43 between each pair of said end-members, a group of preferably three endless conveyor chains 37 which extend around drive sprockets 38 on shaft 35 and around idler sprockets 39 on shaft 36. The bar 40, end-members 42 and blocks 43 are fixedly secured together by screws 45. The end-members 42 at the front end of each unit are supported on the hubs of the sprockets 38, and the end-members 42 at the rear end of each unit are supported on the hubs of the sprockets 39. Each bar 40 is provided on its upper face with tracks 41 for individually guiding the rollers of the chains 37 of one of said groups. The sprockets 38 for each unit are confined between and support the end-members 42 at one end of bar 40, and the sprockets 39 are confined between and support the end-members 42 at the opposite end of the unit. Plates 47 are fixedly secured to some of the channel bars 40 (Fig. 5) and are extended to underlap the bars 40 of adjacent units for closing the gaps between adjacent bars.

A side wall 48 (Figs. 1 and 4) is provided at one side of the delivery section and is pivotally supported at 49 on the side-beam 34 (Fig. 4), so that it may be folded downwardly for convenient access to the filling-material being conveyed by the delivery section. At the opposite side, a wall 50 is provided which is removably supported for placement between the units of the delivery section which are transversely adjustable for different spacing, as hereinafter described.

A series of upper conveyor units and a series of lower conveyor units form continuous compressor and spout sections for successively compressing the filling-material and conveying it, while compressed, into a casing. The upper series of units is vertically adjustable for filling casings of different thicknesses. The transverse spacing between the co-acting units of the upper and lower series is variable for filling casings of different widths.

Each of the compressor and spout units includes an inclined portion for compressing the filling-material and a straight portion for conveying the compressed material into the casing, a group of endless conveyor chains which extend continuously along the inclined and straight portions of the units, and a supporting structure for each unit which includes a guide bar and a group of sprockets for driving the chains. By utilizing chains which extend continuously in the compressor and spout portions of the units and a single guide structure for each unit, the construction is greatly simplified.

Each upper and lower conveyor unit of the compressor and spout sections comprises: a group of three endless chains 60 which extend around sprockets 62, the hubs of which fit a drive shaft which is angular in cross-section; a channel bar generally designated 80 which functions as a guide for said group of chains, and includes an inclined portion 61 and a horizontal portion 63; a pair of side members or plates 70 which are carried on shoulder ends 68 (Fig. 22) of the hubs of sprockets 62, and are secured together in fixedly spaced relation by a sleeve 74, and a screw or rod extending in the sleeve; a shoe 88 which is fixed around the outer end of the cross-member of channel bar 80, around which the chains travel; and a guide shoe 90 which is fixed on one face of the channel bar 80, along which the idle reach of the chains travel for guiding them at the bend between the angular and horizontal portions of said chains. Each chain 60 includes side links 82 and rollers 83. The face of guide bar 80 along which travel the reaches of the chains which engage the filling-material, is provided with longitudinal tracks 84, on which rollers 83 travel and grooves 85 for the side links 82, for individually guiding the chains in parallel paths. The idle or return reaches of chains 60 travel between the side flanges of bar 80 and guide shoe 90 which is fixedly secured by screws 92 to bar 80, is provided with tracks 94 for the rollers 83 and grooves 96 for the side links 82 for individually guiding the chains 60 of the unit. The shoe 90 is bevelled as at 100.

The side flanges of each channel bar 80 are extended forwardly of the front end of the chains 60, and a cross-pin 130 (Fig. 8) is fixed therein and extends through lugs 131, which are fixed to shoe 88 between the chains. This cross-pin effectively strips the filling-material, such as cotton, from the front ends of the chains.

The sprockets 62 for the lower series of compressor and spout units are mounted on a transverse shaft 114 which is journalled in the side frames 30, and the sprockets 62 of the upper series of units are mounted on a transverse drive shaft 115 which is supported for vertical adjustment with the upper series of units. The lower series of the compressor and spout units are supported by a pair of cross-bars 104, 105, which are spaced apart by blocks 108 and are fixedly secured in seats 110 formed on side frames 30. The upper series of compressor and spout units are supported by a pair of cross-bars 112 and 113 which are spaced apart by blocks 117, and are fixedly secured to a frame 132 which is vertically adjustable, as hereinafter described. Blocks 118 and a bar 118a fit between the cross-bars 104, 105, and similar blocks fit between the cross-bars 112, 113, to which the units are connected as hereinafter described.

In practice it is advantageous to keep the chains taut for effectively feeding the filling-material and for preventing it from packing between the guide bars and the conveyor chains. The invention provides means for expeditiously tightening the chains when they become loose from stretch or work.

Each guide bar 80 is slidably connected to its associated pair of side members 70 by a block 128 which is fixedly secured to said bar, and provided with a horizontal slot 129 through which the spacer sleeves 74 extend. Said slot 129 is horizontal to permit horizontal sliding movement of the guide bar to and from the sprockets 62 for tightening the chains 60. Each guide shoe 90 is fixedly secured by screws 92 to channel bar 80 and is slidably supported so that forward movement or adjustment of the guide bar 80 will tighten the chains 60 carried thereby during this sliding movement and the horizontal relationship of the spout portion of the chain will be maintained.

The lower face of each shoe 90 of the lower series of units slidably fits the top face of stationary supporting bars 104 and 105. The upper face of the shoes 90 of the upper series of units slidably fits the lower face of supporting bars 112 and 113. Each shoe 90 is connected below a block 118 or a bar 118a which fits in the space between one pair of stationary cross-bars 104, 105 or 112 and 113, and is adapted to be clamped to said block 118 or bar 118a by a screw 119 which is threaded to said shoe. Each block 118 and the bar 118a is confined vertically in the spaces between the supporting cross-bars by a plate 120 and the shoe 90. Each screw 119 extends through a slot 126 in its associated block 118 or bar 118a, and is provided with a shoulder which is adapted to seat against a shoulder 127 in the slot 126 for locking the shoe and the guide bar 80 to which it is secured, against longitudinal movement.

Each shoe 90 and the guide bar 80 fixed thereto, when its connected screw 119 is released, is urged forwardly by a spring 122 which is confined in a socket 123 in a block 118 or bar 118a and extends into a confronting socket 124 in a confronting flange on said shoe 90. Normally, each shoe 90 and bar 80 will be locked to its associated lock 118 or bar 118a by a screw 119. When screw 119 is released, spring 122 will urge shoe 90 and guide bar 80 forwardly a sufficient distance so that the shoe 88 at the front end of bar 80 will be advanced to tighten the group of chains 60 mounted on said bar. When screw 119 is tightened, shoe 90 and bar 80 will be locked into position to keep the chain taut. This exemplifies a simple means for expeditiously tightening the group of conveyor chains of a unit by merely releasing screw 119 to permit spring 122 to tighten the chains so that, when said screw is tightened, the shoe 90 and bar 80 will be locked into position to keep the chains taut.

The compressor and spout sections are adapted for use with a delivery section of any suitable construction.

The upper compressor and spout units are supported for vertical adjustment to and from the lower units for filling mattresses or cushions of different thicknesses, on a frame generally designated 132, which comprises integral side members 133, front member 134, a rear member 135, and a central longitudinal member 136. The cross bars 112 and 113 from which the shoes 90 and guide bars 80 of the upper compressor and spout units are supported, are fixedly secured to depending lugs 116 on frame 132. Frame 132 is mounted on a pair of front screw posts 138 and a pair of rear screw posts 139, each of which has its upper end journalled in said frame and connected thereto for vertical movement therewith by a sprocket wheel 140 and a collar 141 on said posts, and above and below said frame, respectively. The lower end of each post 138 is screw-threaded into a bushing 144 which is fixedly secured in one of the blocks 108 which is fixedly secured between cross-bars 134 and 135. Above said bushing 144 each post 138 is slidably guided vertically in a bearing 146 on one of the side frames 30. Each post 139 is screw-threaded to a block 148 which is fixedly secured to one of the side frames 30 and is guided vertically in a bearing 149 formed on said side frame. A sprocket chain 152 extends around all of the sprocket wheels 140 on the posts 138 and 139 for simultaneously rotating said posts for vertical rectilinear movement of the upper series of compressor and spout units and frame 132. A hand-wheel 153 is fixed to one of the screw posts 138 for operating chain 152 for simultaneous rotation of posts 138 and 139. The drive shaft 115 for the sprocket wheels 64 of the upper series of units is journalled in bearings 154 on frame 132, so that said drive shaft will be vertically movable with said units. When the hand-wheel 153 is rotated, chain 152 will be operated to simultaneously rotate sprockets 140 and posts 138 and 139. The screw-threaded engagement of posts 139 with fixed bushings 144 and the screw-threaded engagement of posts 139 with blocks 148 will rectilinearly raise or lower the posts, the frame 132, the bearings 154 for drive shaft 115, and the cross-bars 112 and 113 which support the shoes 90, the conveyor chains and channel bars 80 of the upper series of units for varying the spacing between the vertically fixed lower units and the upper units for filling mattresses of different thicknesses.

A hood or cover 156 for the compressor section is secured by screws and spacers 157 (Fig. 10) on frame 132. This cover is vertically adjustable with frame 132 and the upper compressor and spout sections.

The machine is adapted for filling mattresses or cushions of different widths, and the invention provides simplified means for varying the transverse spacing of the upper and lower conveyor and spout units, and includes a detachable side closure for confining the material between the upper and lower of said units, which is movable to function as a partition between the units for filling mattresses or cushions of narrow widths.

For varying the transverse spacing of these units, a group $a$ at one side of the machine, for example, four of each of the upper and lower conveyor and spout units are connected for conjoint transverse movement, the unit $b$ at the opposite side is fixed against transverse movement, and an intermediate unit $c$ is shifted transversely by linkages between the units $a$ and the unit $b$.

A linkage is provided for each of the upper and lower series of compressor units at their inner ends, and a similar linkage is provided adjacent the supporting cross-bars and shoes 90 for maintaining the parallelism of the units. The shoes 90 on the units of each group $a$ are mounted for conjoint transverse movement on a bar 118a which is slidable in the transverse supporting bars on said units. The members 70 of the upper units of each group $a$ are connected for conjoint transverse movement by a bar 181 and may also be cross-connected by a rod 72.

Each linkage associated with a bar 118a of the units $a$ for one compressor conveyer and the blocks 118 of the units $b$ and $c$ of one compressor conveyor, comprises: a link 164 pivoted at 165 to plate 120 which is fixed on bar 118a; a link 166 pivoted at 167 to plate 120 on fixed unit $b$ and at 168 to link 164; a link 169 pivoted at 170 to the central portion of link 164 and at 171 to plate 120 which is fixed on the block 118 on the unit $c'$, and a link 172 pivoted at 171 to plate 120 which is fixed on the intermediate unit $c$ and at 173 to link 166. The linkage for the other compressor conveyor is the same as that for the one compressor conveyor just described, and is shown generally in Figure 7, so need not herein be shown or described further.

The linkage for the inner end of the upper compressor conveyor for one compressor and spout unit comprises: a link 174 pivoted at 175 to a bar 181 which is fixed on the upper sides of the members 70 of units $a$ the upper conveyor of the upper compressor and spout; a link 176 pivoted at 177 to the plate 182 which is fixed on the member 70 of unit $b$, and pivoted at 178 to link 174; a link 179 pivoted at 166 to a plate 183 which is fixed to the members 70 of unit $c$ and at 184 to link 176; and a link 185 pivoted at 186 to plate 183 which is fixed to the members 70 of unit $c$ and pivoted at 188 to the link 176. The linkage connection to the lower unit is the same as that to the upper compressor and spout unit, except the bar 181 and links connected thereto are disposed on the undersides of the members 70. Said linkage connection therefore, need not herein be shown or described further. The front and rear linkages applied to each series of compressor and spout units are relatively staggered for clearance when the linkages are adjusted for the minimum spacing between units a, b and c, and the linkages on the other series of units are similarly staggered.

A longitudinal bar 189 is provided for each of the upper units and the lower compressor and spout units, and has its front end fixedly secured to one of the bars 181 on the group of units a. A brace bar 206 extends diagonally between the outer end of bar 181 and the plate 120 which is fixed to the inner end of bar 118a of each of said upper and lower units. The bars 189 and 206 constitute a rigid connection between the bars 118 and 181 to which the shoes 90 of units of group a are connected.

The linkages for varying the transverse spacing of, and the bars 189 and 216 for, the lower compressor and spout units are identical in construction with those illustrated with the upper units, and, therefore, the linkage for the lower unit has not been illustrated in detail.

When the compressor and spout units are spread apart for filling the maximum width of casing for which the machine is designed, the units will be in relative position, as illustrated in Fig. 21. When a narrower casing is to be filled, the series of units a will be shifted inwardly and the linkages will gradually close the spaces between the intermediate unit c, the inner unit a, and the fixed unit b. This permits the units to be transversely adjusted for close variation within a predetermined range. For a greater range of variation, the invention provides for a side closure or partition which is applicable to any of the units of the group a, as hereinafter described.

The transverse spacing of the upper and lower units is conjointly variable by connections between them which produce conjoint shifting of the upper and lower groups of units a and the linkages operable thereby. These connections are adapted to be maintained in all vertical adjustments of the upper series of compressor and spout units. A vertical post 190 (Fig. 20) is fixedly secured to and depends from the bar 118a which is fixedly connected to the side members 70 of the upper units a, and slidably extends through a channelled portion 191 in the bar 118a which is connected to the units a of the lower series. A post 192 has its upper end fixed to the outer member 70 of the upper series of units a, and is slidably guided in a block 195 which is fixed to the outer member 70 of the lower series of units. These posts connect the group e of the upper and lower series of units for conjoint transverse movement and permit vertical adjustment of the upper series relatively to the lower series. A screw shaft 200, which is provided with a crank 203, is journalled and confined against longitudinal movement in a bearing 201 formed on one of the side frames 30 and is screw-threaded to a block 202 which is fixed to the longitudinal bar 189, which connects the bars 118a and 181 of the lower series of units for transverse movement. Rotation of crank 203 will rotate screw shaft 200 to shift transversely bar 189 which is connected to the bars 118a and bar 181 of the lower series of compressor and spout units. The posts 190, 192 will be simultaneously shifted and impart like movement to the group a of the upper units of said series. The transverse shifting of groups a will simultaneously operate the linkages for shifting the intermediate units c.

The mechanism for driving the conveyor chains comprises an electric motor 220, a counter-shaft 221 journalled in the side frames 30, a pulley 222 on shaft 221 driven by a belt 223 from a pulley 224 on the motor shaft; a stud shaft 225 journalled in one of the side frames 30; a sprocket wheel 226 on shaft 221 which drives a chain 227; a sprocket wheel 228 on shaft 225 driven by chain 227; a sprocket wheel 229 on shaft 225 which drives a chain 231; and a sprocket wheel 232 on the shaft 114 which carries the sprockets 64 for driving the conveyor chains 60 of all the lower units. The drive shaft 35 of the delivery section is driven from shaft 114 by a sprocket 50a on one end of shaft 114 (Fig. 9), a chain 51, and a sprocket 52 on the shaft 35. The shaft 115 which carries all of the sprockets 64 for driving the conveyor chains 60 of all of the upper units, has secured thereto a sprocket wheel 234. A stud shaft 238 is supported by a pair of links 239, 239a which are pivoted co-axially with the shaft 115 and the shaft 35, respectively. Sprocket wheels 236, 240 are journalled on stud shaft 233. A chain 241 extends around a sprocket 243 which is on, and driven by the shaft 35, and around sprocket 240 on the stud shaft 238. A sprocket 236 fixed to the sprocket 240 drives the sprocket 234 on the shaft 115 from the sprocket 236. The chain 241 passes under an idler sprocket 244 on the shaft 114. This driving connection between the shaft 35 and the shaft 115 for the upper series of compressor and spout units permits vertical adjustment of said units while maintaining the driving connection.

The transverse spacing of the units for conveying loose filling-material to the compressor section, each of which comprises the group of three conveyor chains 37, the sprocket wheel 38 on the shaft 35, and the idler sprocket 39 on the shaft 36, which is adjustable along said shaft to accommodate the filling of casings of different widths. The sprockets 37 have sliding engagement with shaft 35, like the idler sprockets 39 are slidably adjustable along the shaft 36. The unit at one side of the machine is fixedly secured against transverse movement.

A linkage is provided adjacent each end of the channel bars 40 for simultaneously and transversely adjusting the units of the delivery section relatively to the unit fixed against transverse movement, for filling mattresses of different widths. Each of these linkages (Fig. 6) comprises a link 258 pivoted at 259 to the block 43 of the transversely fixed unit; a link 260 pivoted at 261 to the block 43 of the unit at the opposite side and pivoted at 262 to link 258; links 263 pivoted at 264 to the blocks 43 of the units adjacent the units at the side of the machine, and at 265 to links 258, 260, respectively; and links 266 pivoted at 267 to the blocks 43 of the central units, and at 268 to the links 258, 260, respectively. A transverse shaft 275 is journalled and held against transverse movement in a bearing 276 (Fig. 4) fixed to beam 34 at one side of the machine, and is provided with a screw thread 277 for engagement with a screw collar 278 which is fixed to one of the side plates 42 of the unit at the opposite side of the machine. A similar screw shaft 279 is provided at the rear end of the machine. Sprocket wheels 282, 283 are fixed to the screw shafts 275, 279, respectively, and connected by an endless chain 284. Shaft 275 is provided with a polygonal end 286, to which a crank may be applied for rotating said shaft 275 for simultaneously rotating through the sprocket wheels 232 and 283 and chain 284, the screw shaft 279. Rotation of the shafts 275, 279 will transversely shift the unit to which screw collars 278 are fixed and the linkages between the units for varying the spacing between them for filling mattresses of different widths.

A closure is provided for each side of the compressor and spout sections. Each side closure comprises an upper and a lower section formed of sheet metal and adapted to be secured to the upper and lower units, respectively. Each side closure includes an upper section with a side wall or member 210 and a flange 211 adapted to overlie an associated guide bar 80, and a lower section having a side wall 212 slidably overlapping the wall 210 of the upper section to close the space between the upper and lower sections in different vertically adjusted positions, and a flange 213 adapted to underlie the bar 80 of a lower unit. One of these side closures is adapted for detachable connections to any of the corresponding upper and lower units of the group a by means of screws 315 and keyhole slots 214 in the flanges of the section. The keyhole slots 214 in the upper and lower sections permit the side closure to be readily connected either to the outermost upper and lower units a or to intermediate units for filling casings of narrow width. The upper and lower sections of the side closure at the units b may be fixedly secured to the channel bars 80 of said units, respectively. The inner ends of said walls 210 and 212 are flared to close the convergent space between the upper and lower compressor units.

The front end of the side 50 of the delivery section is detachably supported from one of the compressor and spout units by a bar 217 and a screw 218 (Fig. 23). The lower end of said bar may be detachably secured to the side members of any of the units a of the compressor and spout sections by a screw 219 which extends through a slot 220 in the lower end of said bar. The inner end of side 50 is provided with tongues 222 which are adapted to straddle the inner ends of the side walls 210 and 212 of the adjustable side closure for the compressor and spout sections. This construction permits the side 50 of the delivery section and the detachable side closure for the compressor and spout sections to be supported at the outer side of the machine or at any of the inner units, for varying the transverse spacing between the sides for filling mattresses or cushions of different widths.

When the units of the compressor and spout sections are set for maximum spacing and filling casings of maximum width, the gaps between the bars 80 of the lower compressor units may be closed by strips 230 (Fig. 7), which are removably supported on studs 231 on the units of the delivery section and on the cross-bar 104. When the spacing between the units is reduced, these strips may be removed or be replaced by narrower strips, if desired.

The operation of the machine will be as follows: Filling material will be loaded onto the conveyor chains 37 and bars 40 and carried forwardly to the compressor section. As the filling-material passes through the compressor section, it will be compressed between the convergent reaches of the groups of chains 60 and the convergent portions of guide bars 80. From the compressor section the compressed filling-material passes between the horizontal portions of the chains 60 and guide bars 80, and will be forced forwardly into the collapsed mattress or cushion casing which has been slipped over the outer end of the spout section. As the casing becomes filled, it will be forced away from the spout section until the mattress or cushion has been completely filled. As the conveyor chains 60 pass around shoes 88 on guide bars 80, pins 130 mounted between the lugs 131, in advance of the shoes 88 and chain 60 will aid in stripping the filling-material from said chains.

A characteristic of providing conveyor units, which include a group of chains on a single guide bar which individually guides the chains, is that the chains may be closely spaced together for more efficiently engaging the filling-material and conveying it forwardly. By providing conveyor chains, which extend continuously along the convergent and horizontal portions of the units of the compressor and spout sections, the flow of filling-material is uninterrupted, and the construction is greatly simplified. By including a group of chains in each unit, and providing a single guide bar with tracks for the group of chains, the construction is simplified.

For filling casings to produce mattresses or cushions of different thicknesses, the operator will manually rotate the hand-wheel 153 which will operate the chain 152 to simultaneously rotate the screw posts 138, 139 to raise or lower the frame 132 on which the upper units of the compressor and spout sections are mounted. Raising or lowering of the frame 132 will simultaneously raise or lower the drive-shaft 115, supporting bars 112, 113, and all of the upper conveyor chains 60 and guide bars 80.

When it is desired to vary the spacing of the compressor and spout units for filling casings of different widths, the operator will rotate crank 203, which will shift bar 189 which is connected to the lower compressor and spout units and posts 190 and 192, which connect the upper group of units a and the group a of the lower units. This will conjointly shift the groups a of the upper and lower units and contract or expand the front and rear linkages between the units of group a, the fixed units b, and the intermediate units c. For the same purpose the detachable side closure may be secured to any of the corresponding upper and lower units. For example, the detachable side closure, when secured to the outer unit a, will confine the filling-material for filling mattresses or cushions of maximum width. When the detachable side closure is secured on the next adjacent upper and lower units, the machine may be operated with five upper and lower units for a narrower mattress or cushion. In like manner, the side closure may be adjusted on the units to exclude filling-material from two or more of the units for mattresses or cushions of lesser width. For correspondingly adjusting the spacing between the units of the delivery section, the operator will apply a crank to shaft 275 and rotate the crank to simultaneously rotate the screw shafts 275 and 279 to operate the linkages connected to units of the delivery section for varying the spacing between them. The side 50 of the delivery section may also be adjusted into longitudinal alignment with the adjustable slide closure on the compressor and spout units.

In practice it has been found that the conveyor chains, when used in the compressor and spout sections, will stretch in use, and for efficient feeding of filling-material, such as cotton, it is necessary to keep taut the reaches of the chain which engage the cotton in their tracks in the guide-bars 80. When wear or stretch occurs, the operator will turn screws 119 to release the shoes 90 and the guide bars 80 attached thereto for longitudinal forward movement by springs 122. The sliding connection at the inner end of bars 80 and spacer sleeves 74 on the side members 70, and the slidability of shoes 90 on their supports, which carries the screws 119, will permit the springs to shift the guide bars to tighten the chains 60 as soon as the screws 119 are loosened. The screws 119 are then tightened to lock the shoes 90 to the slidable blocks in the supporting bars, so that the guide bars 80 will be fixedly positioned to keep the chains taut. This expedites the tightening of the chains when it becomes necessary.

The transverse adjustment of the compressor and spout units may be effected while the upper compressor and spout sections are adjusted for different thicknesses in mattresses, and said upper sections may be adjusted vertically without distributing the transverse spacing of the units.

The invention exemplifies a machine for filling mattresses, cushions, and the like, which comprises units, each of which includes a group of parallel chains and a guide bar with tracks thereon, which makes it possible to provide chains in close relation for efficiently advancing the filling-material. The invention also provides a machine in which the units, including a group of endless conveyor chains, extend continuously between the compressor and spout sections. The invention also comprises simplified means for adjusting the spacing between the conveyor units. The invention also exemplifies improved means for keeping the endless conveyor chains taut. The invention also exemplifies a detachable sectional side closure for the units which is demountable and adapted to be placed on any of the units. The invention also exemplifies improved means for stripping the filling-material from the conveyor chains, at the end of which the material is discharged into the casing.

The invention is not to be understood as restricted to the details set forth since these may be modified within the scope of the appended claims without departing from the spirit and scope of the invention.

Having thus described our invention, what we claim as new and desire to secure by Letters Patent, is:

1. A filling machine of the character described, comprising a frame, a pair of spaced driven shafts mounted on said frame, and a series of individual spaced conveying units driven by said shafts and forming a passageway therebetween for conveying filling material; each unit including a group of parallel endless conveyor chains, sprockets on the shaft for driving the chains, a bar having tracks for a group of the chains and individually guiding the reaches of the chains which engage the filling-material, means connecting one end of each bar to the sprockets, means at the other end of the bar for guiding the chains; and means connected to said frame for individually supporting the bars.

2. A filling machine of the character described, comprising a frame, a pair of spaced driven shafts mounted on said frame, and a series of individual conveying units driven from said shafts and spaced to form a passageway therebetween for conveying filling material; each unit including a group of parallel endless conveyor chains, sprockets on the shaft for driving the chains, a bar having tracks for a group of the chains and individually guiding the reaches of the chains which engage the filling-material, means connecting one end of each bar to the sprockets, means at the other end of the bar for guiding the chains; means connected to the frame for slidably supporting one or more of the units for transverse movement, and means connected to said frame for individually supporting the bars.

3. A filling machine of the character described, comprising a frame, a pair of driven shafts on said frame and a series of individual conveying units having compressor and spout sections driven by said shafts and spaced to form a passageway therebetween for conveying filling material; each unit including a group of parallel endless conveyor chains extending continuously from the inner end of the compressor section to the delivery end of the spout section, sprockets on the shaft for driving the chains, a bar having tracks for a group of the chains and individually guiding the reaches of the chains which engage the filling-material, means connecting one end of each bar to the sprockets, means at the other end of the bar for guiding the chains, a guide shoe between the compressor and spout sections engaging the idle reaches of the chains; and means connected to said frame for supporting the bars.

4. A filling machine of the character described, comprising a frame, a pair of spaced driven shafts and associated idler shafts mounted on said frame, and a series of separate conveying units driven by said shafts and spaced apart to form a passageway therebetween for conveying filling material, each unit including a group of parallel endless conveyor chains extending continuously between the ends of the unit, sprockets on the driven shaft for driving the chains, idler-sprockets mounted on the idler shaft and engaging the chains, a bar having tracks for a group of chains and individually guiding the reaches of the chains which engage the filling-material; end members connected to one end of each bar and to the drive-sprockets adjacent thereto for supporting one end of each bar and end members connected to the other end of each bar and to the idler-sprockets adjacent thereto for supporting the other end of said bars.

5. A filling machine of the character described, comprising a frame, a pair of spaced driven shafts mounted on said frame, and a series of spaced individual conveying units driven by said shafts and spaced apart to form a passageway therebetween having compressor and spout sections; each unit including a group of parallel endless conveyor chains extending from the inner end of the compressor section to the outer end of the spout section, sprockets on the shaft engaging and driving the conveyor chains, a guide bar for each group of chains having separate tracks for individually guiding the reach of the chain which engages the material and around one end of which the chains extend, the bar having continuously extending inclined and straight portions for guiding the chains to compress the filling-material and for conveying the material horizontally into a casing; and means connected to the frame for individually supporting the bars.

6. A unit for a filling machine, comprising: a series of spaced endless conveyor chains forming a passageway therebetween for conveying filling material; a drive sprocket for each conveyor chain; means for guiding the chain to convey filling-material into a casing, including a bar and a guide shoe on the bar; a support on which the bar is supported for longitudinal movement; spring means between the support and the shoe, for urging the bar to tighten the chain; and means for locking the bar on the support for operation of the chain in the position into which it is urged by the spring means.

7. A unit for a filling machine, comprising: a series of endless conveyor chains spaced apart to form a passageway therebetween for conveying filling material; drive sprockets for the conveyor chains; means for guiding each chain to convey filling-material into a casing, including a bar for each chain and a shoe on the bar, a transversely slidable support on which the bar is supported for longitudinal movement; spring means between the support and the shoe for urging the bar to tighten the chain; and means for locking the bar on the support for the operation of the chain in the position into which it is urged by the spring means.

8. In a filling machine provided with a pair of spaced driven shafts, a pair of conveyor units spaced apart to form a passageway therebetween for conveying filling material, comprising: a sprocket wheel on each driven shaft, an endless conveyor chain extending around each sprocket wheel, a guide bar for each conveyor chain for guiding a loop of the chain to convey filling-material into a casing, a transverse member between the sprocket wheel and the guide bar engaging the upper reach of the chain, to which the bar is connected for longitudinal movement therewith; a support on which the bar is slidably mounted for longitudinal movement; spring means for urging the transverse member and guide bar longitudinally in a forward direction to tighten the chain; and means for locking the bar on the support for the operation of the chain in the position in which it is urged by the spring means.

9. In a filling machine provided with a pair of spaced driven shafts, a pair of spaced conveyor units driven by said shafts and forming a passageway therebetween for conveying filling material, each conveyor unit comprising a sprocket wheel on an associated driven shaft, an endless conveyor chain extending around the sprocket wheel, a bar for guiding a loop of the chain to convey filling-material into a casing, a member straddling the sprocket wheel, and to which the bar is connected for longitudinal sliding movement therewith; a support on which the bar is slidably mounted for longitudinal movement; spring means for urging the member and bar longitudinally in a forward direction to tighten the chain; and means for locking the bar on the support for the operation of the chain in the position in which it is urged by the spring means.

10. A machine for filling casings, comprising: a pair of spaced driven shafts; a series of conveyor units spaced to form a passageway therebetween for conveying filling-material into a casing, each conveyor unit including an endless conveyor chain, a sprocket on the associated driven shaft, for driving the associated conveyor chain, and means for guiding the associated conveyor chain, for conveying the filling-material into the casing; supporting means for the units; the series including a unit fixed against transverse movement by the supporting means, a plurality of units, means rigidly connecting said plurality of units together for conjoint transverse sliding movement in the same direction, a slidably mounted unit intermediate the fixed unit and the plurality of units; and means connected between the fixed unit, said plurality of units and the intermediate unit for shifting the intermediate unit.

11. A machine for filling casings, comprising: a pair of spaced driven shafts, a series of spaced conveyor units forming a passageway therebetween for conveying filling-material into a casing, each conveyor unit including an endless conveyor chain, a sprocket on the associated driven shaft, for driving the associated conveyor chain, and means for guiding the chain for conveying the filling-material into the casing; supporting means for the units; the series including a unit fixed against transverse movement to the supporting means, a plurality of units, means rigidly connecting said plurality of units together for conjoint transverse sliding movement in the same direction, a slidably mounted unit intermediate the fixed unit and the plurality of units; and a linkage connected between the fixed unit, said plurality of units, and the intermediate unit, for shifting the intermediate unit.

12. A machine for filling casings, comprising: a pair of spaced driven shafts; a series of spaced conveyor units driven by said shafts and forming a passage therebetween for conveying filling-material into a casing, each conveyor unit including an endless conveyor chain, a sprocket slidable on the associated driven shaft, for the associated conveyor chain, and a bar for guiding the chain for conveying the filling-material into the casing; said bars being connected for transverse movement with the sprockets, supporting means for the units; the series including a unit having its bar fixed against transverse movement to the supporting means, a plurality of units means rigidly connecting said bars together for conjoint transverse sliding movement in the same direction, a slidably mounted unit intermediate the fixed unit and the plurality of units; and means connected between the bar of the fixed unit, one of the bars of said plurality of units and the bar of the intermediate unit for shifting the intermediate unit.

13. A machine for filling casings, comprising: a pair of spaced driven shafts; a series of spaced conveyor units driven by said shafts and forming a passageway therebetween for conveying filling-material into a casing, each conveyor unit including an endless conveyor chain; a sprocket on the associated driven shaft, for driving the associated conveyor chain; a bar for guiding the chain for conveying the filling-material into the casing, and a member connected to said sprockets; supporting means for the bars; the series including one unit having its bar, member and sprocket fixed against transverse movement by the supporting means, a plurality of units means connecting the bars, members and sprockets of said units together for conjoint transverse sliding movement in the same direction, a unit intermediate the fixed unit and the plurality of units having its bar, member and sprocket mounted for transverse sliding movement; and means between the fixed unit, said plurality of units, and the intermediate unit, for shifting the intermediate unit.

14. A machine for filling casings, comprising: upper and lower driven shafts; a series of upper and a series of lower units for conveying filling-material into a casing, each unit including an endless conveyor chain, a sprocket on one of the shafts, for driving the chain, and means for guiding the chains for conveying the filling material into the casing; supporting means for the lower series of units; vertically adjustable means for supporting the upper series of units; each of the upper and lower series including a unit fixed against transverse movement, a plurality of units, a rigid member connecting said plurality of units together for conjoint transverse sliding movement in the same direction, a slidably mounted unit intermediate the fixed unit and the plurality of units; means connected between the fixed unit and said plurality of units connected to the intermediate unit for shifting the intermediate unit; means connecting the plurality of units of the upper and lower series for conjoint transverse movement, and means for transversely adjusting one of the plurality of units.

15. A machine for filling casings, comprising: upper and lower driven shafts; a series of upper and a series of lower units for conveying filling-material into a casing, each unit including an endless conveyor chain, a sprocket on one of the shafts, for driving the chain, and means for guiding the chains for conveying the filling-material into the casing; supporting means for the lower series of units; vertically adjustable means for supporting the upper series of units; each of the upper and lower series including a unit fixed against transverse movement, a plurality of units connected together for conjoint transverse sliding movement, and a slidably mounted unit intermediate the fixed unit and the plurality of units; means between the fixed unit and said plurality of units connected to the intermediate unit for shifting the intermediate unit; posts fixed to move vertically with the upper units and slidably connected to the lower series for conjoint transverse movement; and means for conjointly adjusting the plurality of units of the upper and lower series transversely and conjointly.

16. A machine for filling casings, comprising: a pair of spaced transverse drive shafts; a frame including a fixed cross-bar; a series of conveyor units spaced apart to form a passageway therebetween for conveying filling material, each conveyor unit including an endless conveyor chain for conveying filling-material into a casing, a sprocket for driving said chain slidably mounted on the shaft, a guide bar for a loop of the chain, a member connecting the guide bar and the sprocket for transverse sliding movement; slides on the cross-bar on which one or more of the guide bars are mounted for transverse movement; and means for locking said slides on the cross-bar.

17. A machine for filling casings, comprising: a pair of spaced transverse drive shafts, a frame including a transverse pair of spaced supporting bars; a series of conveyor units spaced apart to form a passageway therebetween for conveying filling material; each conveyor unit including an endless conveyor chain for conveying filling-material into a casing, a sprocket for driving said chain slidably mounted on the shaft, a guide bar for a loop of the chain, and a member connecting the guide bar and the sprocket for transverse sliding movement; blocks between the supporting bars, on which one or more of the guide bars are mounted for transverse movement, and means for locking said blocks to the cross-bars.

18. A machine for filling casings, comprising: a pair of driven shafts; a series of conveyor units driven by said shafts and spaced apart to form a passageway therebetween for conveying filling-material into the casing, each including an endless conveyor chain, a sprocket on the shaft for driving the chain, a bar having a track on one of its faces for guiding the chain for conveying filling-material into the casing, a member connecting the bar and sprocket for transverse movement, and a guide shoe for the chain on the opposite face of the guide bar; a transverse supporting bar, blocks carried by the transverse supporting bar, and means for releasably locking the shoes to the blocks.

19. A machine for filling casings, comprising: a pair of driven shafts; a series of conveyor units driven by said shafts and spaced apart to form a passageway therebetween for conveying filling-material into the casing, each including an endless conveyor chain, a sprocket on an associated driven shaft for driving the chain, a bar having a track on one of its faces for guiding the chain for conveying filling-material into the casing, a member connecting the bar and sprocket for transverse movement, and a guide shoe for the chain on the opposite face of the guide bar; a transverse supporting bar, blocks slidably mounted on the transverse supporting bar, and means for locking the shoes to the blocks.

20. A machine for filling casings, comprising: a pair of conveyor units spaced apart to form a passageway therebetween for conveying filling material, each unit including an endless chain, a sprocket wheel for driving the chain, a guide bar having a fixed shoe on its outer end around which the chain is looped, and a cross-pin mounted on the bar outwardly of and extending transversely of the chain for stripping material therefrom.

21. A machine for filling casings, comprising: a pair conveyor units spaced apart to form a passageway therebetween for conveying filling material, each conveyor unit including an endless chain, a sprocket wheel for driving the chain, a guide channel bar having a fixed narrow shoe on its outer end, around which the chain is looped, and a cross-pin extending transversely of the chain and mounted in extensions of the sides of the bar outwardly of the chain for stripping material therefrom.

22. A machine for filling casings, comprising: a series of units for conveying filling-material into a casing, each including endless upper and lower conveyor chains, sprockets for driving the chains, and guide bars around the outer ends of which the chains are looped, and a side-closure including upper and lower sections fitting on the bars and provided with overlapping side-walls for confining the material transversely, and means for detachably connecting the section of the side closure to bars of different units for filling casings of different widths.

23. A machine for filling casings, comprising: a series of units for conveying filling-material into a casing, each including upper and lower endless conveyor chains, sprockets for driving the chains, and guide bars around the outer ends of which the chains are looped, and a side-closure including upper and lower sections with overlapping side-walls for confining the material transversely and flanges extending across one of the faces of the bars, and means for detachably connecting the section of the side-closure to bars of different units for filling casings of different widths.

24. A machine for filling casings, comprising: a stationary frame, a vertically adjustable frame, a lower series of conveyor units mounted on the stationary frame, a corresponding upper series of units mounted on the vertically adjustable frame; each of the units including a group of parallel chains extending continuously from the inner end of the compressor section to the delivery end of the spout section, sprockets for driving the chains, and a single guide bar with undivided tracks around which a group of the chains is looped; the bars and chains of the upper and lower series of units having convergent portions for compressing the filling-material and straight spout-forming portions for conveying the compressed material into the casing; and means for vertically shifting the vertically adjustable frame for the upper series of units.

HAROLD A. KIBITZ, Jr.
JOSEPH W. DROLL.

References Cited in the file of this patent

UNITED STATES PATENTS

| Number | Name | Date |
|---|---|---|
| Re. 11,944 | White | Nov. 12, 1901 |
| 668,971 | Brown | Feb. 26, 1901 |
| 671,470 | Colahan | Apr. 9, 1901 |
| 894,307 | Zofnass | July 28, 1908 |
| 1,224,384 | Kaukaine | May 1, 1917 |
| 1,687,393 | Scott | Oct. 9, 1928 |
| 1,903,478 | Ross | Apr. 11, 1933 |
| 2,110,359 | Droll et al. | Mar. 8, 1938 |
| 2,302,656 | Dray | Nov. 17, 1942 |